UNITED STATES PATENT OFFICE.

JOHN A. JUST, OF PULASKI, NEW YORK, ASSIGNOR TO THE JUST MINING & EXTRACTION CO., OF SYRACUSE, NEW YORK, A CORPORATION OF NEW YORK.

PROCESS FOR THE RECOVERY OF PRECIOUS METALS FROM ORES, &c.

No. 814,294. Specification of Letters Patent. Patented March 6, 1906.

Application filed March 25, 1905. Serial No. 251,992.

*To all whom it may concern:*

Be it known that I, JOHN A. JUST, a citizen of the United States, and a resident of Pulaski, New York, have invented certain new and useful Improvements in Processes for the Recovery of Precious Metals from Ores and Material Containing Same, of which the following is a specification.

This invention relates to the recovery of precious metals from ores or deposits or material containing them.

The object of the invention is to extract gold and silver, or all other precious metals, directly from the ores or material containing them, without previously chloridizing or roasting the ores or subjecting the ore to any other preparatory process before extracting aside from grinding.

A further object of the invention is to obviate the use of a high temperature.

To these ends the invention consists of the process for carrying out the above objects embodying the steps and mode of operation, substantially as hereinafter fully described and claimed in this specification.

According to my process I convert the precious metals into oxids and simultaneously dissolve the oxids thus formed in a suitable acid to form soluble salts with said acid, then extract them with water or a suitable acid—that is, an acid in which the salts of the precious metals thus formed will readily dissolve. I then separate the solution of the salts of the precious metals from the sands or gangue and recover the precious metals from the solution.

I use preferably sulfuric acid and an oxygen salt or carrier as chemical agents mixed with the ore to carry out my process, and I employ the acid to liberate oxygen from the oxygen salt, so that the oxygen will act in its nascent state the instant it is liberated from its combination and under the conditions hereinafter more fully described.

In order to carry out the process, the oxygen should act in its nascent state, for in this way the precious metals are oxidized and enter into soluble compounds which are dissolved by the excess of acid.

I prefer to use sulfuric acid because of its cheapness and the readiness with which it can be handled in iron or leaden vessels, according to the strength of the acid employed.

Sulfuric acid under the conditions presented herein also has greater power to dissolve the oxids of the precious metals and their salts.

While oxygen gas, or even ozone, has no action whatever on silver, gold, or platinum when suspended in hot or cold sulfuric acid, strong or diluted, oxygen in its nascent state generated directly from suitable oxygen-containing substances in the presence of a free acid or acid salt which is capable of dissolving the silver and gold oxids as formed and forming compounds therewith, which again are soluble in the excess of acid used, will cause all the precious metals of the ore or material containing them to go into solution.

When conditions of the process are well regulated and observed, the precious metals of raw ores, as sulfid ores, deposits, or material containing precious metals, can be brought directly in solution without subjecting these ores to a special traetment of chloridizing or roasting, which, as is well known, causes a great loss of silver, in many cases of almost all of the gold contained in the ore, by reason of the volatile nature of the metallic compounds thus formed. All these sources of loss of precious metals by the high temperature employed are avoided in my process, an extremely low temperature being all that is required.

Although I prefer to use sulfuric acid, phosphoric and other acids can be used. The efficiency of the sulfuric acid for dissolving the oxid of silver, forming silver sulfate, ($Ag_2SO_4$,) is great, and in case it is desirable to use the least quantity of solvent, and thus economize in tank space for the extraction, an acid of about 1.25 specific gravity will dissolve silver and gold sulfate freely. This fact is of great importance in its practical application. In my process I may obtain all the precious metals as sulfates, which are all dissolved in sulfuric acid in one operation from the crude ore. The precious metals, as silver or gold, can be separated from the solution singly or together.

The oxygen salts available for use are many, and the preference is in the cheapness, convenience, and efficiency of such salt, thus: oxid of manganese, native or artificial, potassium permanganate, sodium nitrate, lead peroxid and sesquioxid, red lead, &c.

The reaction of the mixture will take place cold, requiring more time and a somewhat greater concentration; but heating hastens the reaction, and the precious metals pass into solution quickly and completely.

The complete solution of the precious metals contained in the raw ores, as sulfates in sulfuric acid, is insured by the combined and simultaneous actions of oxidizing the precious metals by the nascent oxygen in the presence of sulfuric acid to form metallic salts of the precious metals and in the presence of an excess of sulfuric acid of desired quality to dissolve the salts thus formed, together with the regulation of the heat and concentration, to insure final combination of an oxygenated sulfuric acid. In case sodium nitrate has been used for the purpose of insuring the combination of nitric or nitrous acid with the sulfuric acid at the point of proper concentration the nitro-sulfonic acid thus formed acts in concert in the last step of the process to dissolve the silver and gold. The excess of the latter dissolves these salts in large quantities under the conditions of this process.

In some cases the oxygen salt may be recovered for reuse if it is found economical to do so. The sulfuric acid used is almost entirely recovered for reuse.

In carrying out my process the ore, deposits, or material containing the precious metals is first reduced to a suitable fineness. This fineness depends on the nature of the ore or material to be treated, whether it is very hard and dense or more or less porous in its nature. The denser the nature of the ore the finer it must be reduced in order to reach the finely-disseminated precious metals and insure their complete solution. It is also of great advantage to have the ore finely ground, so as to cause it to float and keep suspended in the acid liquids, thus hastening and accelerating the solution of said metals.

The process may be carried out in any suitable apparatus or vessel, as a shallow vessel or tank lined with lead and provided with a suitable device for heating the contents to a moderate temperature of about 200° to 250° Fahrenheit.

The oxygen salt is intimately mixed with the finely-ground ore in the solution, and in case the salt used is insoluble in water it is intimately mixed in powdered form with the ore, so that it is uniformly distributed. From one per cent. to fifteen per cent. of the weight of the ore or more of a suitable oxygen salt may be used, and this depends entirely upon the presence in the ore of the precious metals to be operated on. To one hundred parts of the ore, by weight, containing from fair to very good values in silver or silver and gold as found in certain sulfid ores, a good proportion of the chemicals is as follows: one per cent. to ten per cent. of the oxygen salt and one hundred and fifty to two hundred and fifty parts, by weight, of diluted sulfuric acid, containing about twenty per cent. to forty per cent. of $H_2SO_4$.

The requisite amount of acid is added to the ground ore first and allowed to act on the baser sulfids present. This I prefer to do in order to avoid loss of oxygen, which will occur more or less when the oxygen salt is directly added. In case of frothing of the mass when the acid is first added it is well to add part of the acid first and allow the base sulfids to decompose and the gas to subside before adding the oxygen salt and the balance of the acid. It is also advisable to add the oxygen salt in portions at a time, increasing the amount of such portions toward the last stage of the process, when the acid is concentrated to a point where it will take up into combination a portion of the oxygen salt or carrier and at the stage where gold is strongly dissolved.

The ingredients are well mixed, so that the ground ore is suspended in the liquid. In case the ore contains carbonates, $CO_2$ is at first disengaged, then some of the sulfids of the baser metals are decomposed by the action of the acid. This action is quite strong, but soon subsides. The oxygen agent or a portion thereof is now added and heat applied to the mixture. This action passes off quickly and before the mixture becomes sensibly warm. The mixture gradually becomes heated to 180° to 200° Fahrenheit. The heat is regulated and the process so conducted during the application of heat that but little or none of the oxygen is driven off and lost. This is readily accomplished by conducting the operation in a very shallow vessel, in which, owing to the continuous concentration by evaporation of the water from the mixture, the temperature of the mass remains low, generally far below the boiling-point of the liquid portion proper, and at no stage does it exceed 250° Fahrenheit. The sulfuric acid at this stage would contain about seventy-five per cent. of $H_2SO_4$, and such acid has a boiling-point of about 334° Fahrenheit. Gold sulfate in solution of concentrated $H_2SO_4$ is precipitated therefrom when such solution is boiled. It will be noticed that no such temperature is required in my process at any stage thereof, and no loss in that direction can of course occur. This insures complete and quick conversion of the precious metals into soluble salts and avoids loss of oxygen.

The oxygen salt may be added in portions at a time as the mass concentrates instead of adding it at once. Thus a sharp action can be obtained toward the end of the process when but very small quantities of the silver sulfid remain to be converted, and these require sharp combined action of the oxidizing agent and the acid. Thus all the silver can be obtained as silver sulfate, ($Ag_2SO_4$.) This reaction may be explained as follows: The first action of the fairly-diluted acid removes the baser sulfids, thus paving the way for the action on the precious metals of the oxygenated sulfuric acid or nitrosulfonic acid at a higher concentration. I prefer to keep air present all through the operation for several reasons—first, to aid in expelling the water-vapors, thus accelerating concentration; second, to keep oxygen (air) present in case an oxygen-carrier, which is capable of recovering itself in the presence of oxygen (air) is employed—like niter, for instance. The presence of free oxygen (air) during the reaction herewith also prevents the reduction of the niter compounds to so low a state as nitric oxid, from which state they can no longer be recovered, because sulfuric acid cannot retain that portion of nitrogen oxids which has been reduced to the state of nitric oxid, and therefore keeping an excess of oxygen (air) present prevents the reduction to nitric oxid and permits its absorption. In the presence of oxygen (air) nitric oxid is absorbed by sulfuric acid; but then it is really nitrous acid which is absorbed. The presence of sulfuric acid prevents the oxidation from proceeding beyond the formation of nitrous acid, the latter combining with the sulfuric acid to form nitro-sulfonic acid and water. The reaction taking place with nitrous acid in excess, as will be commonly the case, the reaction may be represented as follows:

that is to say, besides nitro-sulfonic nitric acid and nitric oxid are also formed. Hence the advantage of free oxygen-air is understood. Nitro-sulfonic acid must be constructed on the supposition of being a compound of sulfuric acid with nitrous acid, as follows:

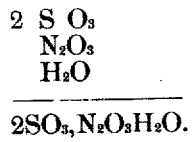

$$2SO_3, N_2O_3H_2O.$$

The compound whose molecular weight has to be halved must be regarded as nitrosulfonic acid.

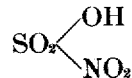

That is, as sulfuric acid, one of whose hydroxyls is replaced by the nitro group, as nitric acid for whose hydroxyl is substituted the sulfo group.

The steps of this process are carefully adjusted in order to obtain the results sought by this invention—that is, the direct, quick, and complete extraction of precious metals with the least possible waste and expense.

In case a nitrate is used as an oxygen-carrier it is therefore important to regulate the changes that niter undergoes, so that it is retained with the sulfuric acid in combination to act in concert upon the precious metals in the raw ore. By this operation copper is also converted into soluble salts.

If desired, the nitrosulfonic acid may be directly made as such and used in this process for extracting gold and silver; but in this case there would be some losses of niter from the action on the baser metals in the first instance, but the loss could be avoided by acting upon the baser sulfids separately with sulfuric acid before adding the nitrosulfonic acid.

When the proper concentration has been attained, (one-half to one-third of the original volume,) the heating is interrupted and the precious metals of the ore are found in the solution. The proper point of concentration thus being attained, water or acidulated water is added to dilute the solution containing the precious metals. According to the condition of the solution containing more or less gold or more or less silver, the solution is then more or less diluted, but under no conditions need it be diluted below the degree in which it was originally employed—that is, it may be diluted to two-thirds or more of its original volume. In case much gold is present with the silver, desired to be extracted in concentrated form of solution, as sulfate, sulfuric acid of about 1.25 specific gravity or higher should be maintained. The solution is now separated from the gangue or sands by allowing the sands to settle and decanting the solution or by filtration. After removing the strong solution of the salts of the precious metals the sands are washed and the washings added to the first and strong solution. Washings containing only very small traces of the metallic salts can be used for diluting the concentrated mass in the original extraction vessel by itself or acidified with sulfuric acid. From the clear solution thus obtained the silver or gold or gold and silver can be directly reduced to their metallic state together or separately or precipitated as sulfids or as desired in any suitable way.

The liquor will yield its precious metals when treated with metallic iron, zinc, copper, &c. The silver may be precipitated by a chlorid or hydrochloric-acid gas or by liquid hydrochloric acid. In order to recover the sulfuric acid used in this process for reuse, a process of separating the precious metals from their acid solution should be resorted to which least contaminates the acid. The silver therefore should be removed in such a way with hydrochloric-acid gas that no excess of HCl remains in the acid solution and rather allow a trace of silver sulfate to remain in the acid solution, the metal of which would in the subsequent operations of separating the gold go down with that metal. Any excess of HCl remaining in the acid solution would cause a loss of silver, as insoluble chlorid, in the subsequent extraction in the reuse of the acid. The silver chlorid in case the solution was precipitated with HCl is removed and the metallic silver recovered therefrom in the usual way.

The gold is next separated in its metallic state. This may be done with metallic iron or otherwise. The reduced precious metals are then melted and cast in suitable forms in the usual way. The gold and silver, if both metals are present, can be directly reduced to the metallic state without separating by iron, zinc, copper, &c., and the resulting metallic precipitate separated from the solution dried and melted or silver parted from the gold, as desired. In this way more sulfuric acid would be extracted from the original solution and more ferrous sulfate formed in case iron was used as the reducing agent. The ferrous sulfate which naturally forms in the reduction of gold and silver by metallic iron must be oxidized to ferric in this case before using the acid solution again. In case the washings of the sands that were added to the stronger solution of the precious metals first obtained in the extraction has diluted them, so that it is advisable to concentrate same, it may be allowed to run over heated shallow pans in presence of air. Thus the ferrous sulfate will readily oxidize to ferric while the acid solution is concentrating.

The ferric sulfate which accumulates in the acid solution does no harm and cannot accumulate beyond a certain amount, since the ferric sulfate is but slightly soluble in sulfuric acid, especially when strong. It will be precipitated from the solution when it is most concentrated at the stage when the extraction of the mass is about completed and will remain with the sands. However, the sulfuric-acid solution as used in this process, saturated with ferric sulfate, while it does not interfere with the completion of the solution of the salts of the precious metals contaminates the sulfuric acid for reuse and complicates the process.

H₂S is a most convenient agent to precipitate the silver and gold sulfates as follows:

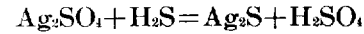
and
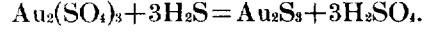

Thus both sulfids precipitate quickly and completely and also settle very quickly. The liquor above the sulfids is drawn off and passed through a convenient filter to retain the finely-suspended sulfids. The precipitate is washed until free from all adhering acids and salts and pressed into cakes and dried. The dried material is then roasted in contact with air to burn off the sulfur. The roasted mass is then melted down with niter and borax, or it may be parted in the usual manner. The solution of sulfuric acid can therefore retain a limited quantity of ferric sulfate only. More or less iron is present in any case from the crude ore.

It is evident that the precious metals may be recovered from the acid solution in any convenient way and by any suitable method. The recovery and reuse of the sulfuric acid contribute to the economic value of this process, besides no roasting and chloridizing at high temperature at the expense of a large amount of fuel, which is not always available in neighborhoods where gold and silver bearing ores abound, besides the large loss of precious metals incident to such roasting.

Ordinarily the reaction to dissolve silver sulfid in sulfuric acid requires four molecules of sulfuric acid, as follows:

and simultaneously

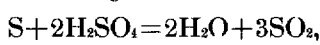

(referring to pure sulfids not disseminated in raw ores.) In my process in the presence of nascent oxygen one molecule of H₂S₄O suffices, as follows:

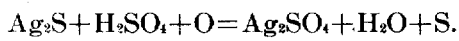

The gold reaction to auric sulfate is probably expressed as follows:

$$Au_2 + 3O(nascent) = Au_2O_3$$

and simultaneously

or
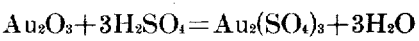

Auric sulfate is soluble in sulfuric acid and soluble in hydrochloric acid, but not attacked by nitric acid.

Obviously some features of this invention may be used without others and the process may be used in widely-varying forms.

Therefore without enumerating all equivalents of the steps of my process, I claim, and desire to obtain by Letters Patent, the following:

1. The process of recovering precious metals from ores or materials containing said metals which consists in subjecting the ores or materials to the action of nascent oxygen and an acid capable of forming compounds with the oxids of the precious metals formed and dissolving said compounds.

2. The process of recovering precious metals from ores or materials containing said metals, which consists in subjecting the ores or materials to the action of nascent oxygen and an excess of an acid capable of forming compounds with the oxids of the precious metals formed whereby said compounds are dissolved by the acid.

3. The process of recovering precious metals from ores or materials containing said metals which consists in treating the ores or materials with an oxygen-yielding substance, and a suitable agent capable of liberating oxygen from its compound and also capable of dissolving the oxids of the precious metals formed by the nascent oxygen liberated.

4. The process of recovering precious metals from ores or materials containing said metals which consists in treating the ores or materials with nascent oxygen generated in an acid solution capable of forming soluble compounds with the precious metals.

5. The process of recovering precious metals from ores or materials containing said metals which consists in treating the ores or materials with nascent oxygen generated in an excess of an acid solution capable of forming soluble compounds with the precious metals, whereby said compounds are dissolved in said excess acid solution.

6. The process of recovering precious metals from ores or materials containing said metals, which consists in pulverizing or granulating said ores or materials, suspending said granulated material in a solution containing an oxygen-yielding substance and sulfuric acid, gradually heating the solution until it is concentrated to about one-half or less of its original volume, diluting the solution to nearly its original volume, separating the acid solution from the sands and gangue, and separating the silver and gold from the acid solution.

7. The process of recovering precious metals from ores or materials containing said metals, which consists in pulverizing or granulating said ores or materials, suspending said granulated material in a solution containing an oxygen salt and sulfuric acid, gradually heating the solution until it is concentrated to about one-half or less of its original volume, diluting the solution to nearly its original volume, separating the solution from the sands and gangue, separating the silver and gold from the acid solution, and recovering the acid solution for reuse.

8. The process of recovering precious metals from ores or materials containing said metals, which consists in treating the ores or materials simultaneously with nascent oxygen and excess of an acid of suitable concentration to form compounds with the oxygen salt of the precious metals formed, whereby the excess of acid dissolves said salts.

9. The process of treating silver, and silver-sulfid ores, or materials containing said metal and metallic compound, which consists in the economic step of treating ores containing silver and silver sulfid, or materials containing them, with nascent oxygen generated in the presence of sulfuric acid from a suitable oxgen-yielding substance thereby completing the conversion of the silver into its sulfate with only one molecule of sulfuric acid.

10. the process of recovering precious metals from ores or materials containing said metals which consists in treating the ores or materials with an oxygen-yielding substance, and a substance which will react with said oxygen-yielding substance to produce nascent oxygen, and which is also a solvent for the oxids of the precious metals formed, and passing a current of air through said material.

11. The process of recovering precious metals from ores or materials containing said metals which consists in first grinding the ore to a suitable fineness, adding sulfuric acid to decompose the baser sulfids passing a current of air through the mass, heating the mass and adding niter thereto, continuing the heating until the mass is suitably concentrated, diluting the mass with acid or acidulated water to substantially its original volume, separating the solution from the sands, washing the sands free from adhering metallic salts, precipitating the metals from the acid solution, recovering the metals from said precipitate, and recovering the acid solution for reuse.

12. The process of recovering precious metals from raw sulfid ores or materials containing said metals which consists in first grinding the ore to a suitable fineness, adding sulfuric acid and a suitable oxygen salt thereto, heating until the metals are in solution, separating the solution from the sands, precipitating the metals from said solution, separating the precipitate from the solution and recovering the acid for reuse.

13. The process of recovering silver from raw sulfid ores or materials containing said metal, which consists in first grinding the ore to a suitable fineness, adding sulfuric acid and a suitable oxygen salt thereto, heating until the silver is in solution, separating the solution from the sands, precipitating the silver from said solution, separating the precipitate from the solution and recovering the acid for reuse.

In testimony whereof I have signed this specification in the presence of two subscribing witnesses.

JOHN A. JUST.

Witnesses:
H. G. OGDEN, Jr.,
OLIN N. FOSTER.